United States Patent
Ravasio et al.

(12)

(10) Patent No.: US 6,236,777 B1
(45) Date of Patent: May 22, 2001

(54) RELIABILITY OF AN OPTICAL COMMUNICATION SYSTEM AND OF AN OPTICAL AMPLIFYING SYSTEM, AND A METHOD SUITABLE TO THIS AIM

(75) Inventors: Filippo Bentivoglio Ravasio, Bergamo (IT); Paolo Ottolenghi, Sceaux (FR)

(73) Assignee: Pirelli Cavi e Sistemi S.p.A., Milan (IT)

( * ) Notice: Subject to any disclaimer, the term of this patent is extended or adjusted under 35 U.S.C. 154(b) by 0 days.

(21) Appl. No.: 09/075,868

(22) Filed: May 12, 1998

Related U.S. Application Data
(60) Provisional application No. 60/046,591, filed on May 15, 1997.

(30) Foreign Application Priority Data

May 13, 1997 (EP) .................................................. 97201441

(51) Int. Cl.$^7$ .................................................. G02B 6/28
(52) U.S. Cl. .................................................. 385/24; 372/6; 359/341
(58) Field of Search .................................................. 385/24; 372/6; 359/341

(56) References Cited

U.S. PATENT DOCUMENTS

| | | |
|---|---|---|
| 5,173,957 | 12/1992 | Bergano et al. . |
| 5,185,826 | 2/1993 | Delavaux . |
| 5,204,923 | 4/1993 | Grasso et al. . |
| 5,241,414 | 8/1993 | Giles et al. . |
| 5,253,104 | 10/1993 | Delavaux . |
| 5,890,816 | * 4/1999 | Delavaux .................................. 385/11 |

FOREIGN PATENT DOCUMENTS

| | | |
|---|---|---|
| 0 508 880 | 10/1992 | (EP) . |
| 0 621 663 | 10/1994 | (EP) . |
| 2272102 | 5/1994 | (GB) . |
| 2 284 926 | 6/1995 | (GB) . |
| WO 92/05642 | 4/1992 | (WO) . |

OTHER PUBLICATIONS

R. Syms and J. Cozens, Optical guided waves and devices, McGraw–Hill, p. 448, Jan. 1992.*

Zervas, Michael N. et al., "Efficient erbium–doped fibre amplifiers incorporating an optical isolator," *SPIE*, vol. 1789, Fiber Laser Sources and Amplifiers IV (1992), pp. 145–154 (1992).

* cited by examiner

Primary Examiner—Cassandra Spyrou
Assistant Examiner—Leo Boutsikaris
(74) *Attorney, Agent, or Firm*—Finnegan, Henderson, Farabow, Garrett & Dunner, L.L.P.

(57) ABSTRACT

An improvement in the reliability of an optical communication system comprising two optical fiber lines, a first transmitter for transmitting at least a signal in the first optical line, a second transmitter for transmitting at least a signal in the second optical line, at least one two-stage-amplifier in each of said first and second line, laser pumps providing pumping signals to said stages of the amplifiers, a first receiver for receiving the signal from the first optical line, and a second receiver for receiving the signal from the second optical line, wherein said laser pumps form a single system that provides a first pumping signal to at least one stage of said at least one amplifier of each of said first and second line.

22 Claims, 8 Drawing Sheets

RELIABILITY OF AN OPTICAL COMMUNICATION SYSTEM AND OF AN OPTICAL AMPLIFYING SYSTEM, AND A METHOD SUITABLE TO THIS AIM

This application is based on European Patent Application No. 97201441.9 filed on May 13, 1997 and U.S. Provisional Application No. 60/046,591 filed on May 15, 1997, the content of which is incorporated hereinto by reference.

The present invention relates to an improvement in the reliability of an optical communication system optically amplified comprising two optical fiber lines, as well as of an optical amplifying system, and a method for improving the reliability of an optical communication or an optical amplifying system.

In recent years, optical long distance communication system optically amplified has become increasingly common. In fact, in a long distance communication system, periodic optical amplifiers have become attractive alternatives to opto-electronic converters and electronic regenerators/repeaters to overcome signal attenuation. As a result, there is much interest in developing highly reliable yet low cost optical amplification systems.

Reliability is especially important when the communication system is not readily accessible, such as in undersea applications.

Rare earth doped optical amplifying fibers have been developed to provide high quality optical amplification at a relatively low cost. Among the doped amplifying fibers, excellent results have been achieved with Erbium doped fibers. Energy is provided to the doped optical amplifying fibers using a laser pump The doped amplifying fiber and the laser pump can be integrated into the optical fiber using a wavelength division multiplexer (WDM). The pump laser excites rare earth ions to a higher energy level to form an appropriate amplifying medium via inversion of the rare earth ions. The signal at the input of the Erbium doped amplifying fiber is thereby amplified by stimulated emission.

Since the laser pump is the only active component in the amplification system, it is the most likely to degrade or fail. Such failure would render the optical amplifier, and possibly the optical communication system inoperative. In order to overcome such a drawback, several techniques have been developed to design optical communication systems capable of limiting the impact of laser pump failure or degradation.

Redundancy has been suggested many times to obviate to optical amplifiers failures.

U.S. Pat. No. 5,173,957 issued to Bergano et al. relates laser pump redundancy for an optical fiber amplifier wherein at least two laser diodes are coupled via a 3 dB optical coupler to supply pump power to each of two one-stage optical fiber amplifiers simultaneously (FIG. 8 attached hereto). If one of the laser diode pumps fails, the other laser diode pump provides power to each of the optical fiber amplifiers Thus, failure of one laser pump causes a 50% reduction in the pumping power of each of two one-stage optical fiber amplifiers.

U.S. Patent No. 5,241,414 issued to Giles et al. discloses a group of optical amplifiers wherein pump beams from an array of lasers are mixed together by means of a star coupler to form a plurality of composite pump beams. Each composite pump beam is distributed to the pump port of a particular optical amplifier of a group of optical amplifiers.

U.S. Patent No. 5,253,104 issued to Delavaux discloses a balanced doped fiber optical amplifier. FIG. 7 shows an amplifier consisting of a preamplifier first stage and power booster second stage cascaded along a same optical fiber line. In this configurations pump signals are distributed and coupled between first and second stage so as to both share pump sources and provide a sparing arrangement.

Published UK Patent Application GB 2,272,202-A, discloses a diode-pumped optical fiber amplifier with its amplifying fiber divided into two parts so that there are two amplifier stages, both pumped by a laser diode. A second diode may be included for redundancy, its outputs being coupled via a pair of polarization beam splitter/combiner.

Published PCT Application WO 92/05642 discloses an optical fiber amplifier having one or more active fibers so coupled to an optical transmission line that each of the active fibers has at least one input for a pump signal. The optical fiber amplifier has an optical combination network with a plurality of inputs coupled to respective pump lasers. The outputs of the combination network are coupled to the pump signal inputs on the active fibers. The network is adapted to combine the optical energy added from the pump lasers so that the optical energy on each one of the outputs of the combination network originates from several pump lasers.

As a further improvement of the above mentioned solutions, in case of a two-stage optical amplifier reliability could be obtained by means of two laser pumps; each laser pump being connected with both stages of said optical amplifier. As shown in FIG. 1, the optical amplifier for optical fiber 402 comprises a first stage amplifying fiber 404, a second stage amplifying fiber 406, a first WDM 408, a second WDM/ 410, a coupler 412, and laser pumps 414 and 416. Here, pumping signals from the laser pumps 414 and 416 are coupled by coupler 412 which distributes the coupled pumping signal to first and second stages 404 and 406 via WDMs 408 and 410. The first WDM 408 interfaces optical fiber 402 with the pumping signal. In this manner, the first stage amplifying fiber 404 is pumped so that the signal received from the optical fiber 402 is amplified. Similarly, the second WDM 410 receives the pumping signal so that the second stage amplifying fiber 406 is pumped. Accordingly, the second stage amplifying fiber 406 amplifies the signal received from the first stage amplifying fiber 404. However, in said amplifier failure of one laser pump would cause a 50% reduction in the pumping power.

The present invention aims to limit said 50% reduction of the pumping power in each optical fiber line of an optical communication system comprising two optic fiber lines without any additional cost, compared to a two lines optical communication system wherein each line is provided with a two-stage optical amplifier as shown in FIG. 1.

More particularly, A is an object of this invention to provide an improvement in the reliability of an optical communication system comprising two optical fiber lines, a first transmitter for transmitting at least a signal in the first optical line, a second transmitter for transmitting at least a signal in the second optical line, at least one two-stage-amplifier in each of said first and second line, laser pumps providing pumping signals to said stages of the amplifiers, a first receiver for receiving the signal from the first optical line, and a second receiver for receiving the signal from the second optical line, wherein the reliability is improved in such a way that the possible failure of one laser pump causes less than 50% reduction in the pumping power in each optical fiber line.

It is a second object of this invention to provide an improvement in the reliability of an amplifying system comprising two optical fiber lines, at least one two-stage-amplifier in each line, laser pumps providing pumping signals to said stages of the amplifiers, wherein the reliability is improved in such a way that the possible failure of one laser pump causes less than 50% reduction in the pumping power in each optical fiber line.

It is a third object of this invention to provide an improvement in an amplifying system comprising two optical fiber lines, at least one two-stage-amplifier in each line, laser pumps providing pumping signals to said stages of the amplifiers, wherein the losses of gain and the increases of noise figure caused by failure of a laser pump are substantially limited.

It is a further object of this invention to provide an improvement in a method for providing a laser pump signal in an optical communication system comprising a first and a second optical fiber lines, wherein the possible failure of one laser pump causes less than 50% reduction in the pumping power in each optical fiber line.

These and other objects have been achieved by an optical communication system, an amplifying system and a method described herein below.

It has now been found that the above mentioned objects are achieved by providing a single laser pumping system that supplies a first pumping signal to at least one stage of a two-stage amplifier in each optical fiber line.

Accordingly, it is an object of this invention to provide an improvement in the reliability of an optical communication system comprising two optical fiber lines, a first transmitter for transmitting at least a signal in the first optical line, a second transmitter for transmitting at least a signal in the second optical line, at least one two-stage-amplifier in each of said first and second line, laser pumps providing pumping signals to said stages of the amplifiers, a first receiver for receiving the signal from the first optical line, and a second receiver for receiving the signal from the second optical line, the improvement consisting in that said laser pumps form a single system that provides a first pumping signal to at least one stage of said at least one amplifier of each of said first and second line.

Preferably, said system further provides a second pumping signal to the other stage of said at least one amplifier of each of said first and second line.

More preferably, said laser pumps are at least four.

It is a second object of this invention to provide an improvement in the reliability of an optical amplifying system comprising two optical fiber lines, at least one two-stage-amplifier in each line, and laser pumps providing pumping signals to said stages of the amplifiers, the improvement consisting in that said laser pumps form a single system that provides a first pumping signal to at least one stage of said at least one amplifier of each of said first and second line.

Preferably, said system further provides a second pumping signal to the other stage of said at least one amplifier of each of said first and second line.

More preferably, said laser pumps are at least four.

It is a further object of this invention to provide an improvement in a method for providing a laser pump signal in an optical communication system comprising a first and a second optical fiber lines, said method comprising the steps of a) generating first and second laser pump signals;
b) coupling said first and second laser pump signals to form first and second output signals;
c) generating third and fourth laser pump signals;
d) coupling said third and fourth laser pump signals to form third and fourth output signals;

the improvement consisting in that 1) the first and second output signals are supplied to one of the first and second stages of an amplifier of said first optical fiber line and to one of the first and second stages of an amplifier of said second optical fiber line; and 2) the third and fourth output signals are supplied to the other of the first and second stages of an amplifier of said first optical fiber line and to the other of the first and second stages of an amplifier of said second optical fiber line.

Preferably, the first and third output signals are coupled to form a fifth and a sixth output signals while the second and fourth output signals are coupled to form a seventh and an eighth output signals, each of said fifth, sixth, seventh, and eighth output signals being supplied to a single stage of an amplifier.

A more complete understanding of the invention may be obtained by reading the following description of specific illustrative embodiments of the invention in conjunction with the appended drawings in which.

Figure 8:
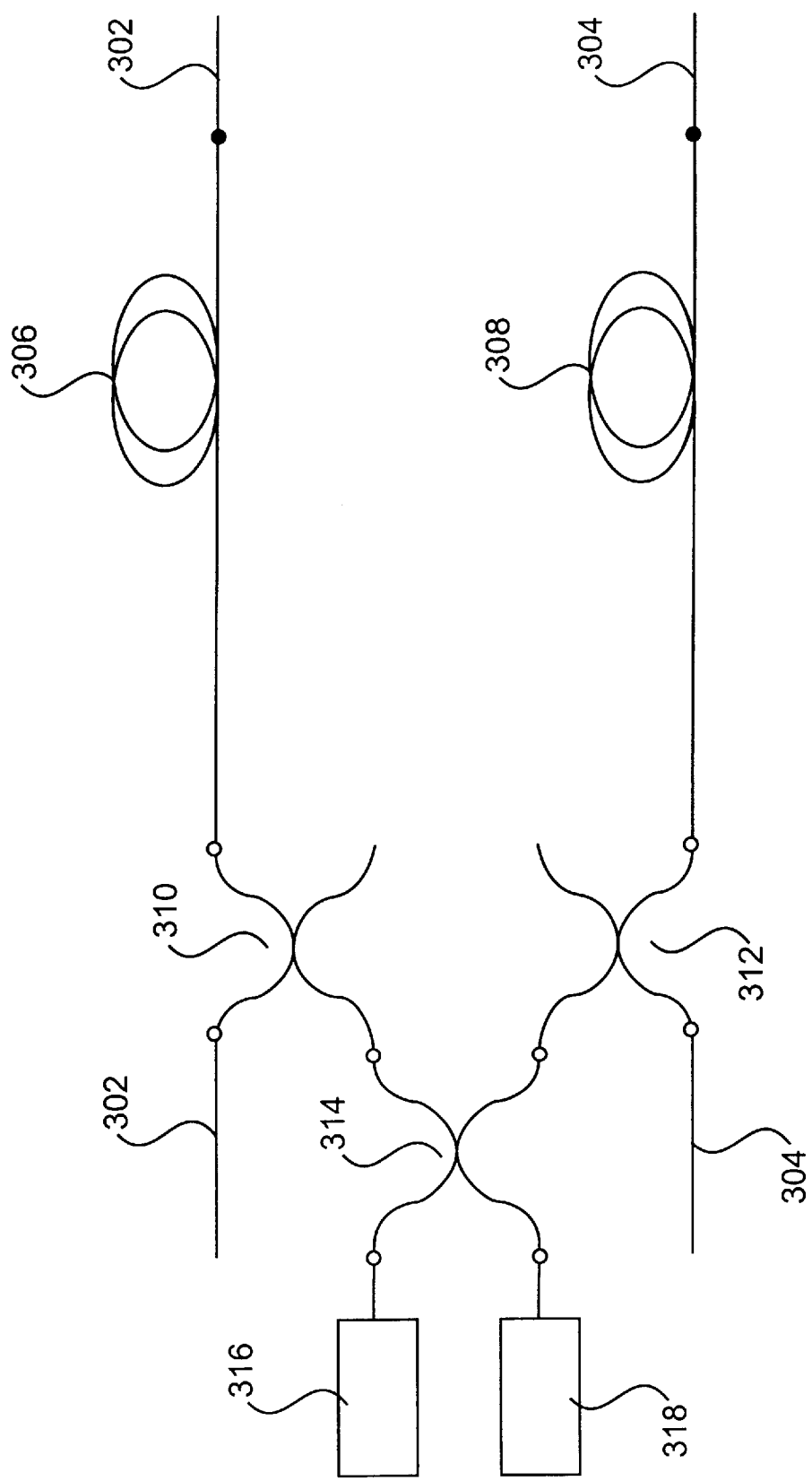

FIG. 8 is a diagram of a conventional optical amplifying system according to U.S. Pat. No. 5,173,957.

The known optical amplifying system of FIG. 8 according to U.S. Pat. No. 5,173,957 comprises a first optical fiber line 302 and a second optical fiber line 304, first and second amplifying fibers 306 and 308, first and second WDMs 310 and 312, a coupler 314, and laser pumps 316 and 318. Laser pumps 316 and 318 provide pumping signals which are coupled by coupler 314. From the coupler 314, the coupled pumping signals are distributed to first and second amplifying fibers 306 and 308 via first and second WDMs 310 and 312, respectively. In this manner signals of first and second optical fiber lines can be respectively amplified.

In this system, if one of the laser pumps 316 and 318 fails, the remaining laser pump will continue to pump the amplifying fibers 306 and 308. If the power of the remaining laser pump remains the same (hot stand by mode with reduction in performance), a laser pump failure causes a reduction in the pumping power of each optical amplifier. Alternatively, the optical amplifying system can operate without reduction in the pumping power by increasing the power of the remaining laser pump (hot stand by mode without reduction in performance). However, approximately twice the power of the laser pump will be required.

However, if one laser pump fails, the pumping power in each amplifying fiber is reduced by 50%.

Figure 1:
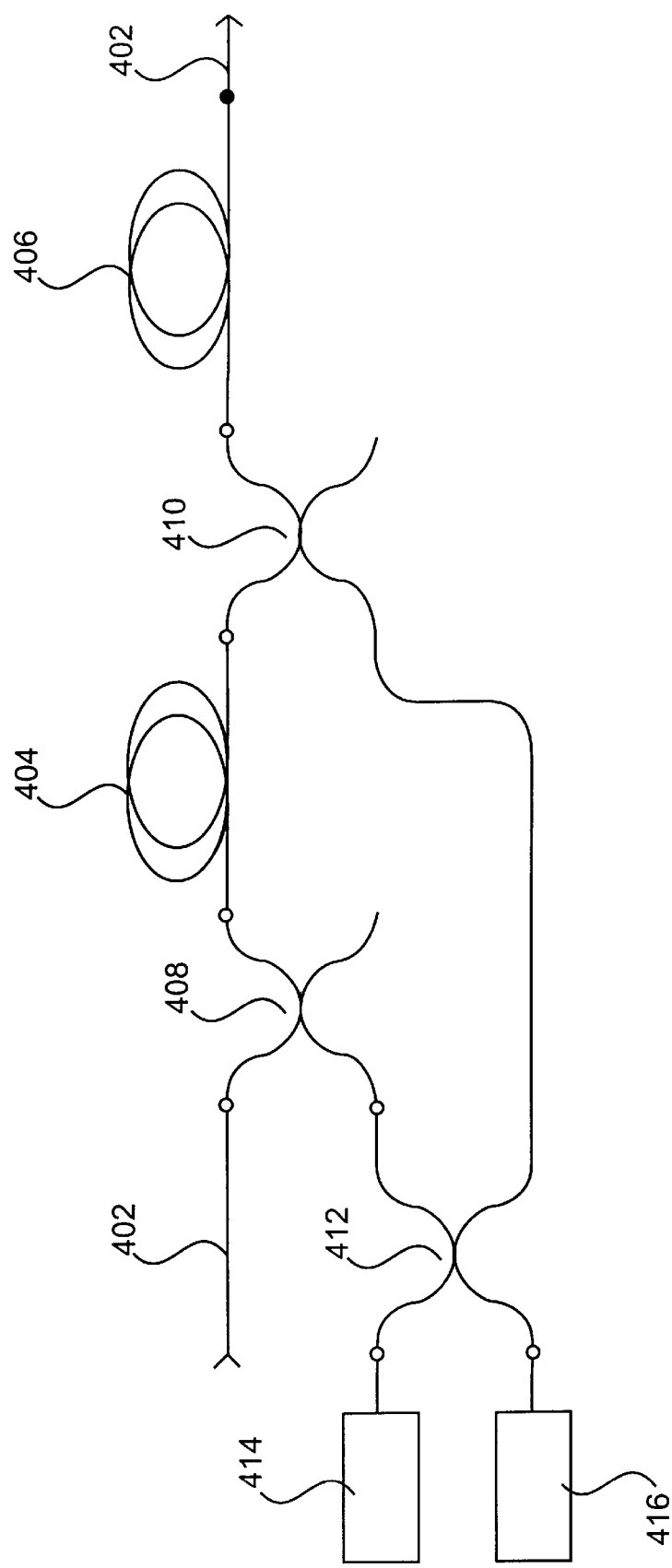
FIG. 1 is a diagram of a possible optical amplifying system comprising a two-stage amplifier.
Figure 2:
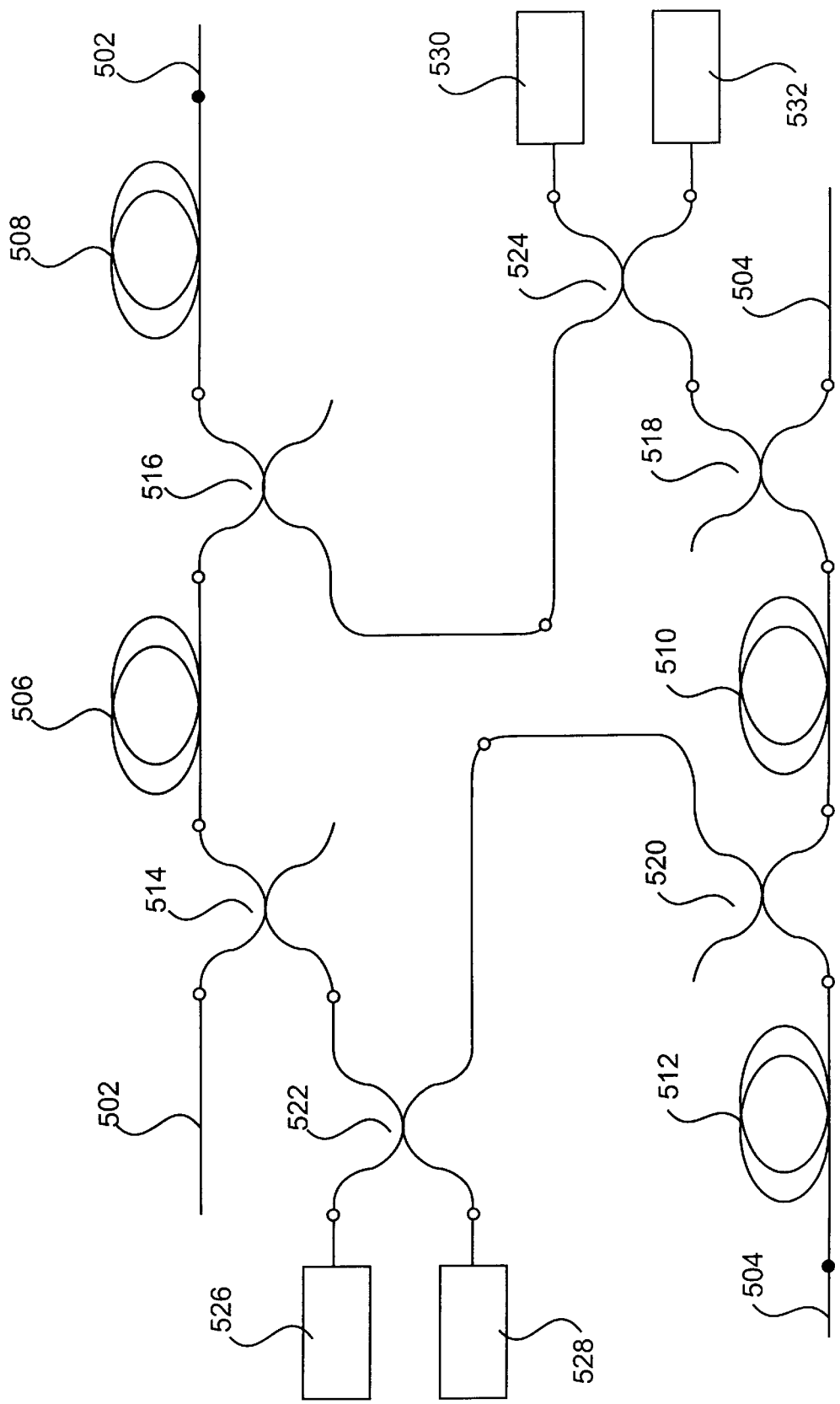
FIG. 2 is a diagram of an optical amplifying system in accordance with a first embodiment of the present invention.

The optical amplifying system of FIG. 2 comprises two optical fiber lines 502 and 504, amplifying fibers 506 and 508 for the first optical line 502, amplifying fibers 510 and 512 for the second optical line 504, wavelength division multiplexers (WDMs) 514, 516, 518, and 520, couplers 522 and 524, and laser pumps 526, 528, 530, and 532.

Here, the output of laser pumps 526 and 528 are coupled by coupler 522. The coupled pumping signals from coupler 522 pump amplifying fibers 506 and 512 via WDMs 514 and 520, respectively. In addition, the output of laser pumps 530 and 532 are coupled by coupler 524. The coupled pumping signals from coupler 524 pump amplifier fibers 508 and 510 via WDMs 516 and 518, respectively. Accordingly, the pumped amplifying fibers 506 and 508 will amplify signals received from optical fiber 502, and pumped amplifying fibers 510 and 512 will amplify signals received from optical fiber 504. The optical amplifying system of FIG. 2 would be suitable for amplification of signals propagating in either direction through optical fiber lines 502 and 504.

Figure 3:
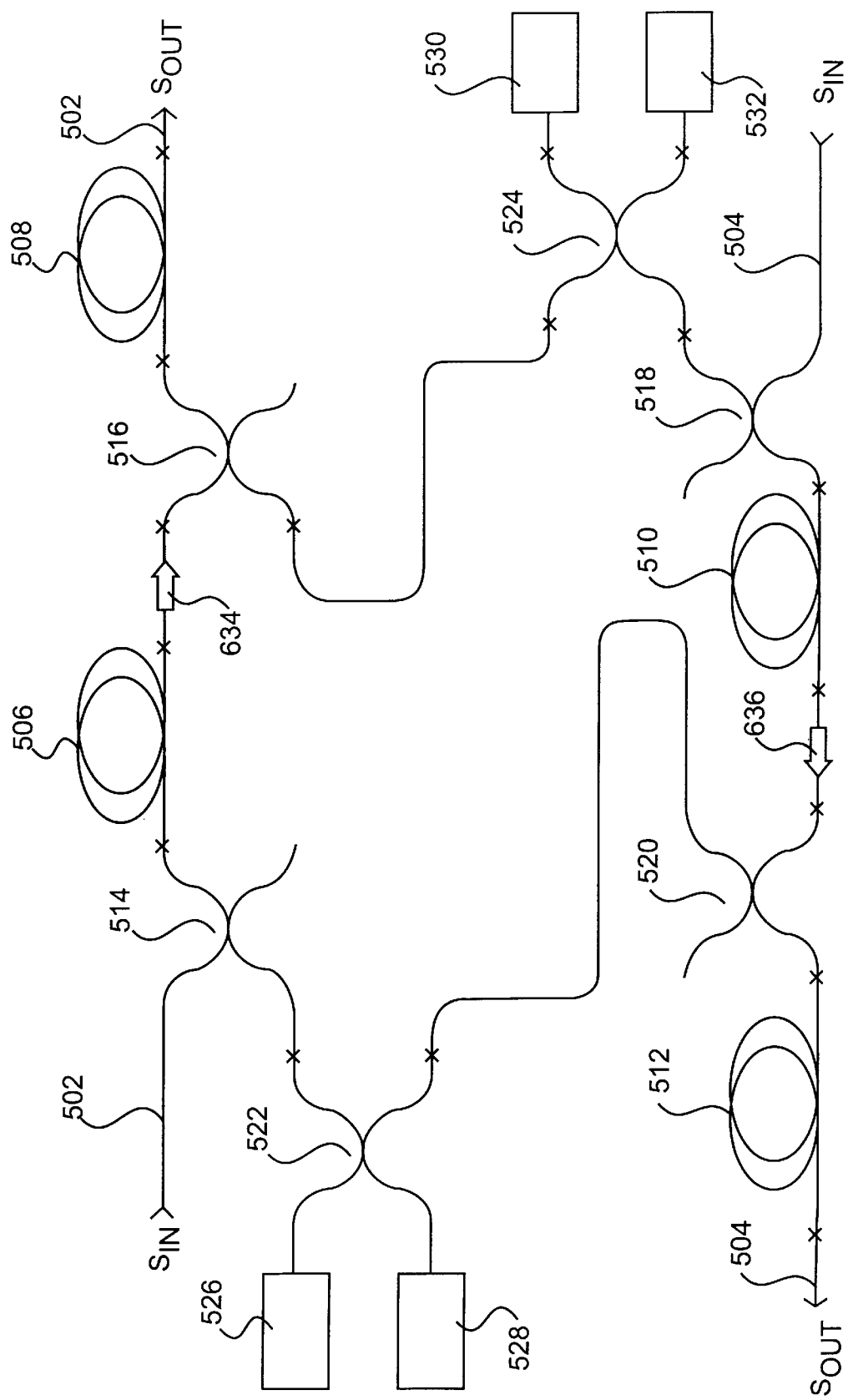
FIG. 3 is a diagram of a preferred embodiment of an optical amplifying system of the type shown in FIG. 2.

In FIG. 3, optical fiber line 502 acts as a send line whereas optical fiber line 504 acts as a return line.

Here, the optical amplifying system further comprises optical isolators 634 and 636 to transmit the optical signal only from the first to the second stage of each two-stage-amplifier. The isolators 634 and 636 substantially transmit the signal and substantially block counterpropagating radiation. In addition, they can block the pump radiation, if a pump wavelength outside the isolator transmission band is used, for example 980 nm with currently available isolators. Isolators 634 and 636 are arranged between the first and second amplifier stage of the respective optical fiber lines in order to maximize performance in terms of noise figure and gain by reducing counter-propagating ASE. In the case, not represented, where one of the amplifiers has copropagating pump in the first stage and counter-propagating pump in the second stage, the isolator further avoids coupling of the two pumps.

Further discussion on the use of isolators in optical amplifiers is disclosed in U.S. Pat. No. 5,204,923, and in M. N. Zervas, R. I. Laming, and D. N. Payne, "Efficient Erbium-Doped Fibre Amplifiers Incorporating an Optical Isolator", SPIE vol. 1789 Fiber Laser Sources and Amplifiers IV(1992), pp. 145–154.

Instead of, or in combination with one or both optical isolators 634, 636, the skilled in the art may envisage use of means of a known type to fulfill, according to known techniques, the requirements of specific embodiments of the invention. Examples are unidirectional means, e.g. optical circulators, filtering means, e.g. filters to remove ASE, spectrally selective or time selective multiplexing/demultiplexing means to selectively add or drop optical signals to/from the communication line, dispersion compensation means to compensate wavelength dispersion. The above cited means may be combined. For example, an optical circulator may be used, in combination with filters, multiplexers/demultiplexers and/or dispersion compensators.

The amplifying fibers 506, 508, 510, and 512 of FIG. 3 are Erbium doped fibers. In an example, the amplifying fibers are silica fiber having a 0.3 numerical aperture with a Germanium Erbium (Ge/Er) doped core. Erbium acts as the active dopant. Proper amplification is obtained, e. g., from amplifying fibers of about 17 m in length for the combined first and second stages if the Er concentration in the core of the optical fiber is such as to cause a 7 dB/m signal loss in the described conditions.

As shown in FIG. 3., the signals $S_{in}$ and $S_{out}$ contain one or more discrete wavelengths selected in an amplification band of the fiber active dopant, for single channel or multichannel (e.g. WDM) transmission.

Preferably, laser pumps 526, 528, 530, and 532 are laser diode pumps which produce a pumping signal at a preselected pumping wavelength. While other wavelengths may be selected, the Erbium doped fibers in the example of FIG. 3 are pumped by the pumping signal at 980 nm. In the described experiment a single channel, at a wavelength of 1536 nm, has been transmitted.

A pump wavelength of 980 nm is convenient in that it provides relatively high gain with low noise in Erbium doped fibers. Alternatively, for example, 1480 nm may also be used for the pumping signal. While other wavelengths may be used for the signal and the pumping signal, the pumping signal generally has a smaller wavelength than the signal.

While different splitting ratios may be conveniently selected, in this preferred embodiment, couplers 522 and 524 are 3 dB couplers so that the coupled pumping signals traveling from coupler 522 are equal each other and the coupled pumping signals traveling from coupler 524 are also equal each other.

The positions of the corresponding amplifying fibers and WDMs can be configured for co-pumping or counter-pumping with regard to the signal direction. That is, the directions of the pumping signal and the signal can be the same or opposite. FIG. 3 shows co-pumping for all amplifying fibers. Furthermore, the pumping direction of each respective stage of each two-stage-amplifier may be different.

The coupled laser diode pump pairs 526 and 528 or 530 and 532 may be operated in one of two modes in the preferred embodiment: hot stand-by mode with reduction in performance or hot stand-by mode without reduction in performance. That is, in hot stand-by mode with reduction in performance, when one laser diode pump fails, the remaining laser diode pumps continue to be operated at the same power level. In hot stand-by mode without reduction of performance, the power of the remaining laser diode of the coupled pair is increased to compensate for the loss.

The results of experiments carried out with the optical amplifying system of FIG. 3, comprising a two-stage amplifier for each optical fiber line, and operated in hot stand-by mode with and without reduction of performance are summarized in Tables 1 and 2, respectively. Here, the gains G1, G2 along respective first and second two-stage amplifiers are given in logarithmic dB units. In Table 1, when one laser pump fails ($P_{p2}=0$), the maximum gain loss is of about 2.5 dB, in case of small signal, and of about 3 dB, when the amplifier is operated in saturation, while the maximum noise figure increase is of about 0.5 dB. Some small differences in said gain loss depend on corresponding differences in the performances of the first stage amplifying fibers 506 and 510 as compared to the second stage amplifying fibers 508 and 512. Thus, the gain loss is slightly different depending on the decrease of the pumping power to said first or said second stages.

In order to evaluate the advantages of this invention, additional experiments have been carried out with the known optical amplifying system of FIG. 8. The relevant results are summarized in Tables 4 and 5 showing the performance of the optical amplifying system of FIG. 8 when operated in hot stand-by mode with and without reduction in performance, respectively. Here, the gains G1, G2 along first and second, respectively, one-stage amplifiers are given in logarithmic dB units. Table 4 shows that when one laser pump fails ($P_{p2}=0$), the gain loss is of about 5 dB in case of small signal, and of about 4 dB when the amplifier is operated in saturation, while the noise figure increase is of about 1 dB in case of small signal, and of about 1,5 dB when the amplifier is operated in saturation.

Compared to the data of Table 4, the data of the Table 1 show that, in case of a laser pump failure, the performances of the amplifying system of FIG. 3 according to a first preferred embodiment of the invention are at least almost 2 dB better as to the gain loss and at least almost 0,5 dB better as to the noise figure.

Figure 4:
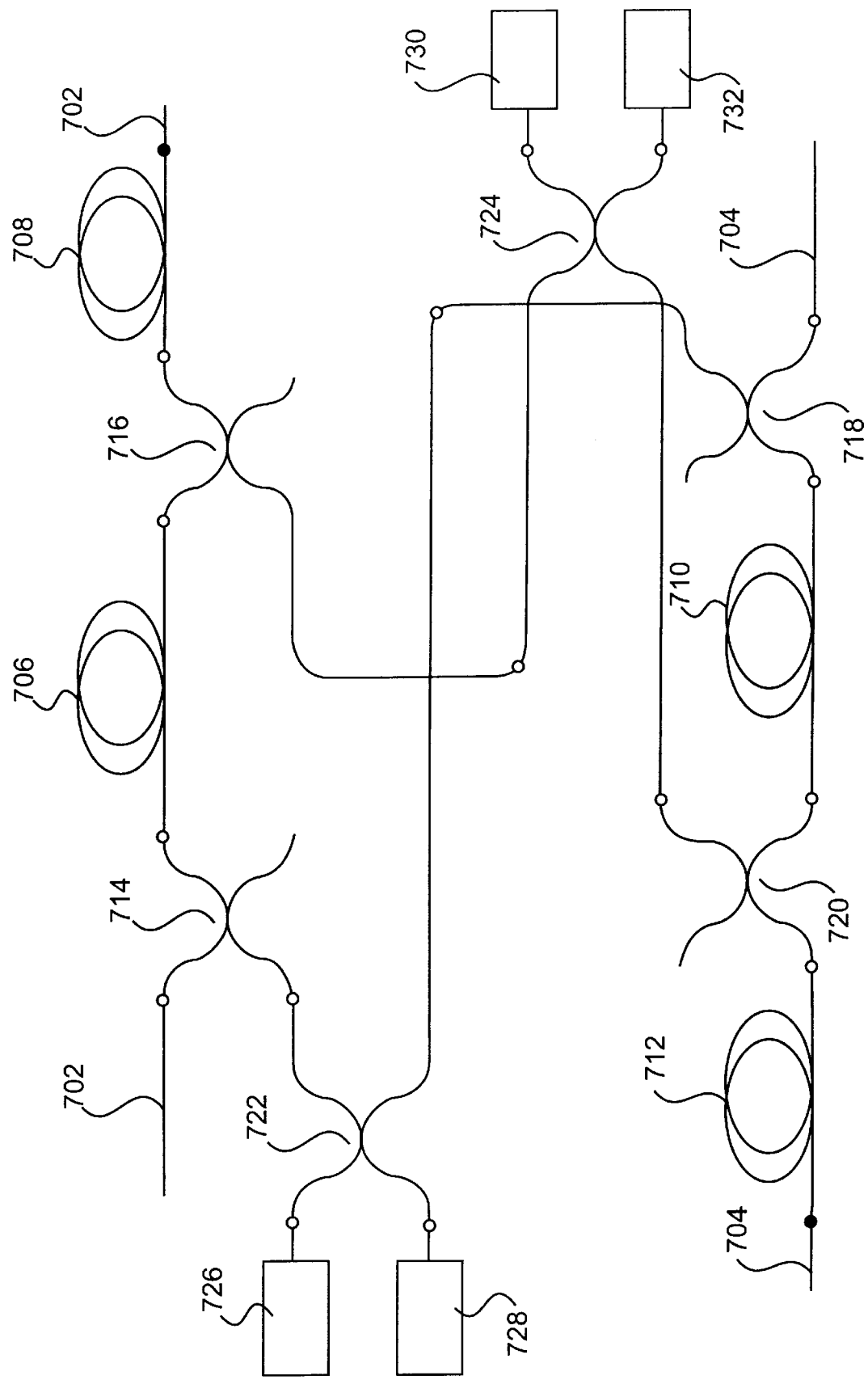
FIG. 4 is a diagram of an optical amplifying system in accordance with a second embodiment of the present invention.

The optical amplifying system of FIG. 4 operates in a similar manner as the first embodiment except that coupler 722 is connected to amplifying fibers 706 and 710 via WDMs 714 and 718, respectively, and that coupler 724 is connected to amplifying fibers 708 and 712 via WDMs 716 and 720, respectively.

Preferably, said second embodiment is provided with isolators in a manner similar to that shown in FIG. 3.

Further, when optical fiber lines 702 and 704 are operated as send and return lines, respectively, the first stage amplifying fibers 706 and 710 are pumped by the same coupled pumping signal in output from coupler 722, and the second stage amplifying fibers 708 and 712 are pumped by the same coupled pumping signal in output from coupler 724. Therefore a laser pump failure will cause a reduction of the pumping power either in the first stage amplifying fibers 706 and 710 or in the second stage amplifying fibers 708 and 712 of both two-stage amplifiers. That means that the two-stage amplifiers of the two fiber lines will suffer the very same gain loss because the performances of the first stage amplifying fibers 706 and 710 are equal each other and the performances of the second stage amplifying fibers 708 and 712 are also equal each other while there are small differences in the performances of each first stage (706, 710) compared to the respective second stage (708, 712).

Figure 5:
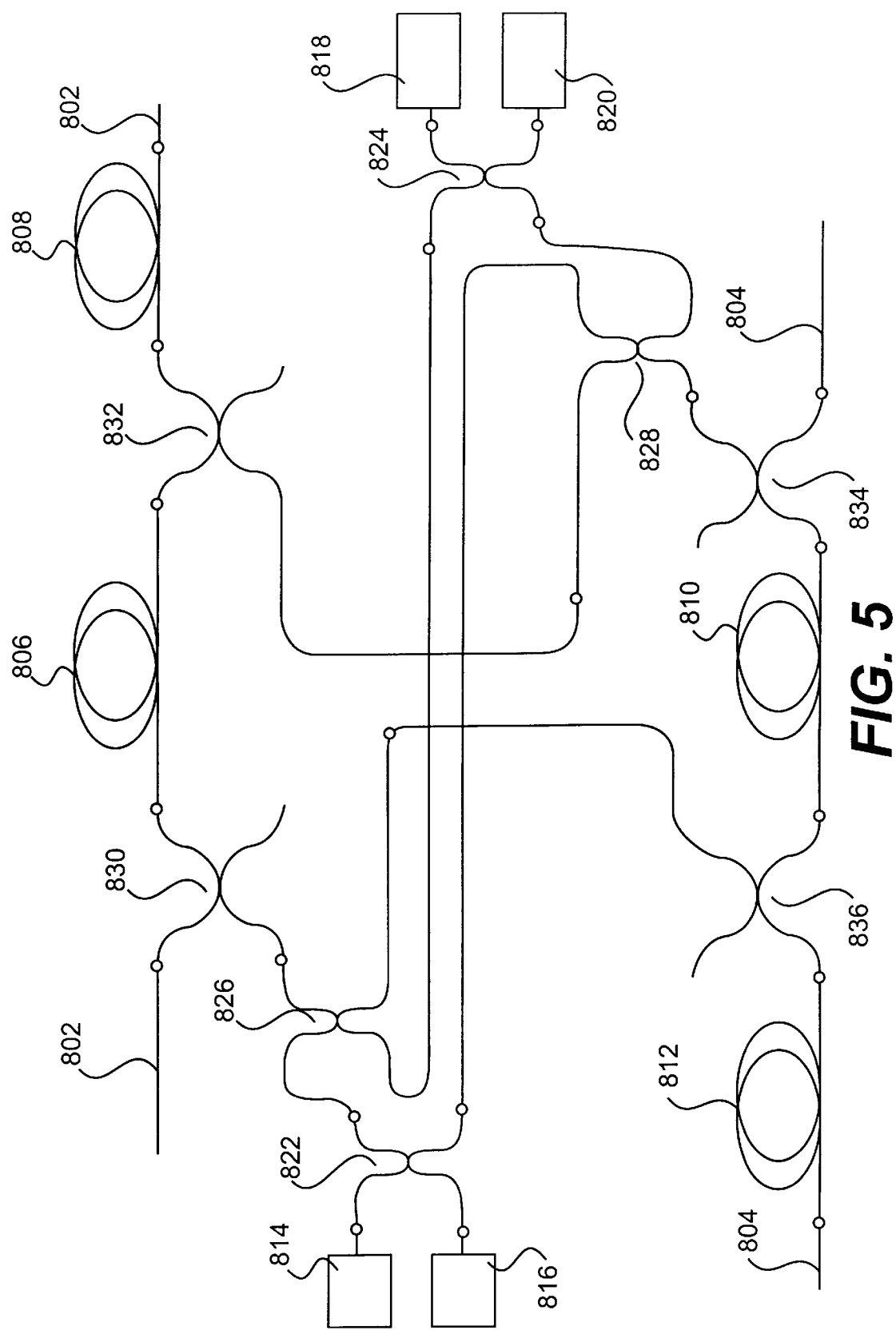
FIG. 5 is a diagram of an optical amplifying system in accordance with a third embodiment of the present invention.

The third embodiment of FIG. 5 comprises two optical fiber lines 802 and 804, amplifying fibers 806 and 808 for the first optical fiber 802, amplifying fibers 810 and 812 for the second optical fiber 804, laser pumps 814, 816, 818, and 820, couplers 822, 824, 826, 828, and WDMs 830, 832, 834, and 836.

Here, the output of laser pumps 814, 816, 818 and 820 are coupled by couplers 822 and 824, respectively. In turn a first coupled pumping signal from coupler 822 and a first coupled pumping signal from coupler 824 are coupled by coupler 826, while the second coupled pumping signal from coupler 822 and the second coupled pumping signal from coupler 824 are coupled by coupler 828. Then, the pumping signals from couplers 826 and 828 enter, in any desired combination, the amplifying fibers 806, 808, 810, and 812 via respective WDMs 830, 832, 834, and 836. This third embodiment is also suitable for amplification of signals propagating in either direction through the optical fiber lines 802 and 804.

Figure 6:
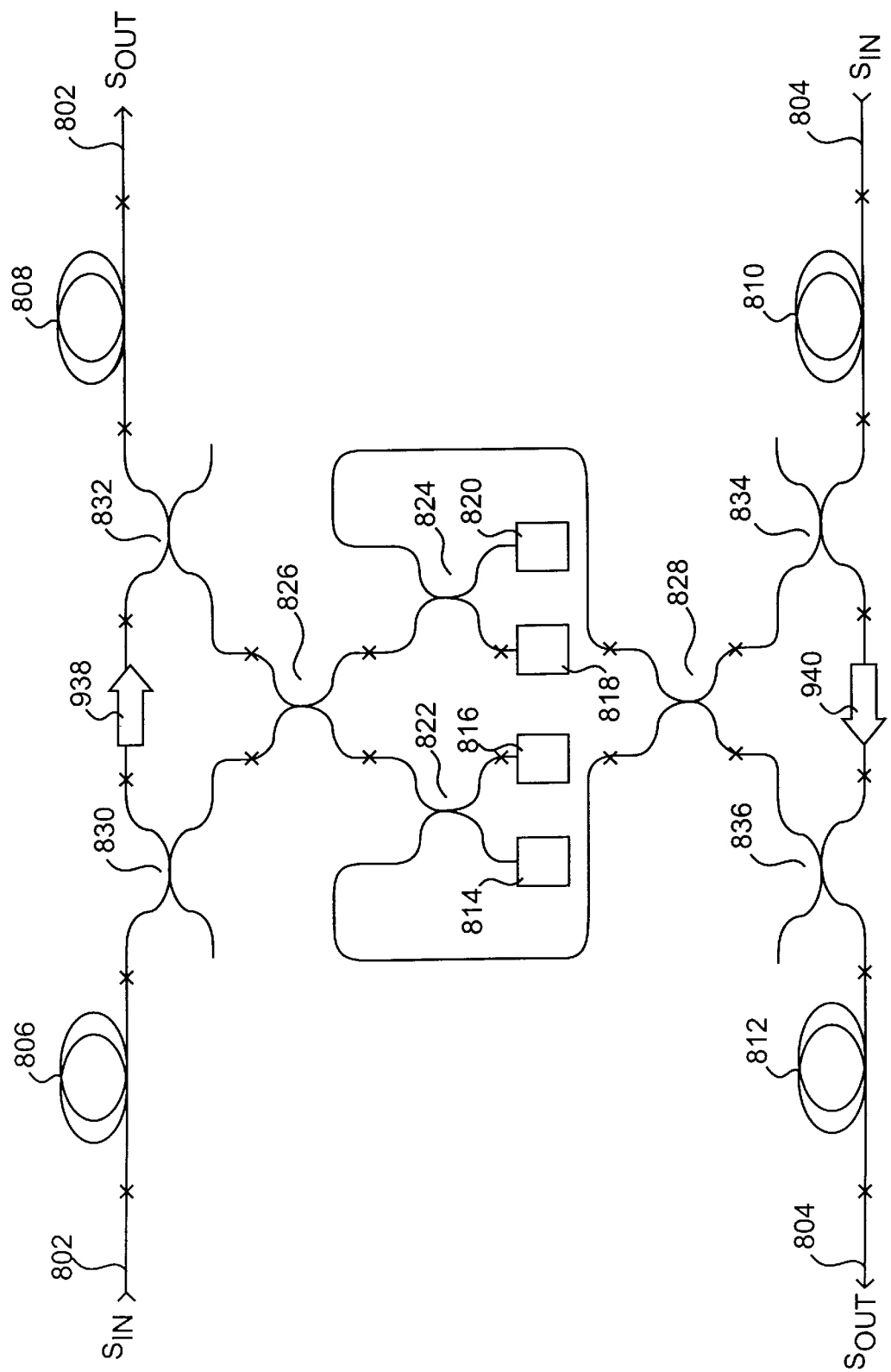
FIG. 6 is a diagram of a preferred embodiment of an optical amplifying system of the type shown in FIG. 5.

In the embodiment shown in FIG. 6, the optical fiber line 802 acts as a send line whereas optical fiber line 804 acts as a return line.

Here, the optical amplifying system further comprises isolators 938 and 940. In this preferred embodiment, the isolators 938 and 940 completely transmit the signal while blocking counterpropagating noise. Isolators 938 and 940 are arranged between the first and second amplifier stages of the respective optical fiber line as described for the first embodiment.

The amplifying fibers 806, 808, 810, and 812 of FIG. 6 are Erbium doped fibers as previously described. The Erbium doped fibers of FIG. 6 are pumped by the pumping signal. In this manner, the signal is amplified by stimulated emission in the amplifying fibers.

As shown in FIG. 6, the signals $S_{in}$ and $S_{out}$ preferably contain one or more discrete wavelengths selected in an amplification band of the fiber active dopant. Furthermore, laser pumps 814, 816, 818, and 820 are laser diode pumps which produce a pumping signal at a preselected pumping wavelength. The Erbium doped fibers of FIG.6 are pumped by a pumping signal at 980 nm while, as previously described, other wavelengths may be selected. The pumping signal generally has a smaller wavelength than the signal.

In this preferred embodiment, couplers 822, 824, 826, and 828 are 3 dB couplers so that the coupled pumping signal traveling from couplers 826 and 828 are equal each other.

Additionally, the positions of the corresponding amplifying fibers and WDMs can be designed for co-pumping or counter-pumping with regard to the signal direction. That is, the directions of the pumping signal and the signal can be the same or opposite. Furthermore, the pumping direction of the respective stages of each two-stage-amplifier does not need to be the same. For example, FIG. 6 shows amplifying fibers 808 and 812 co-pumped, and amplifying fibers 806 and 810 counter-pumped.

In said third embodiment the coupled laser diode pump pairs 814, 816, 818, and 820 are operated in one of two modes: hot stand-by mode with reduction in performance or hot stand-by mode without reduction in performance. That is, in hot stand-by mode with reduction in performance, when a laser diode pump fails, the remaining laser diode pumps continue to be operated at the same power level. In turn, in hot stand-by mode without reduction of performance, when a laser diode pump fails, the power of at least one remaining laser diode pump is increased to compensate for the loss.

Preferably, the power of all remaining laser diode pumps of the system are increased to compensate for the loss. These arrangement allows operating the laser pumps at lower drive current compared to the case wherein only the power of the remaining laser pump of the coupled pair is increased. Thus, the laser lifetimes is lengthened and the reliability of the communication system improved.

The results of experiments showing the performance of an optical amplifying system of FIG. 6 and operated in hot stand-by mode with reduction of performance, are shown in the Table 3, wherein the gains G1, G2 of the first and second two-stage amplifier are shown in dB. When one laser pump fails ($P_{p2}=0$), gain decreases by 1 dB, in case of small signal gain, and by 1.5 dB, when the amplifier is operated in saturation, while the maximum noise figure increase is of about 0.5 dB.

Compared to the data of Table 4, the data of the Table 3 show that, in case of a laser pump failure, the improvements in the gain achieved with the amplifying system of FIG. 6 according to a third preferred embodiment of the invention ranges from about 2,5 dB to about 4 dB while the improvements in the noise figure ranges from about 0,5 dB to about 1 dB.

Figure 7:
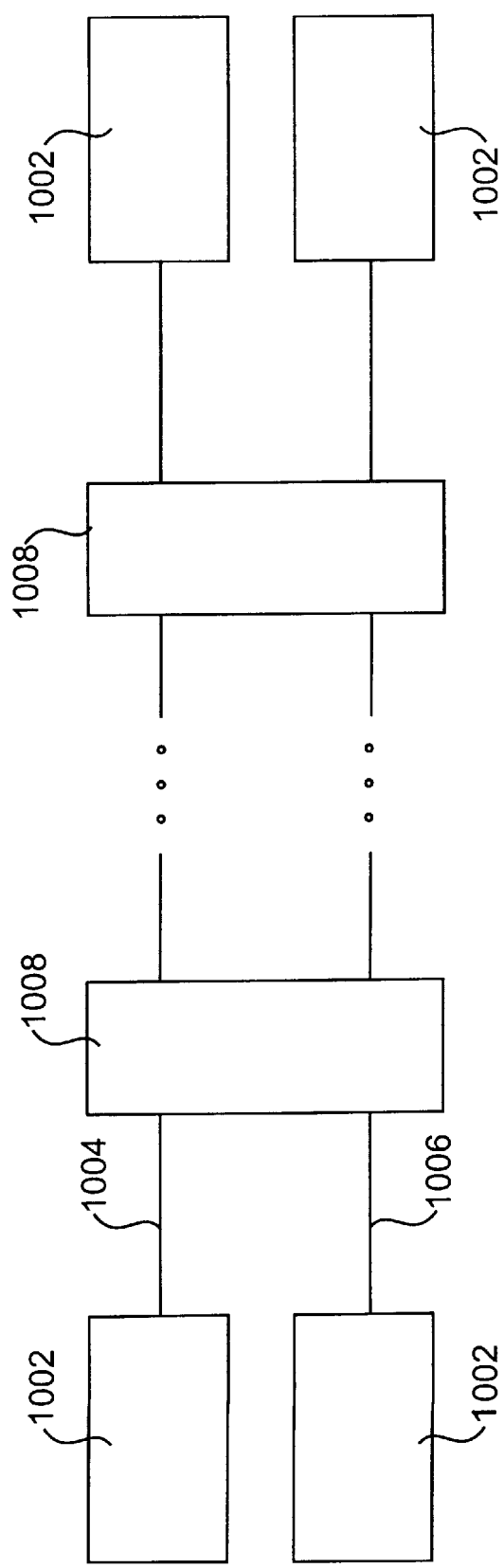
FIG. 7 is a schematic diagram of an optical communications system in accordance with the present invention.

In FIG. 7, receiver/transmitter station 1002 receive and transmit optical fiber signals for optical fiber lines 1004 and 1006. Each of the receiver/transmitter 1002 may comprise both receivers and as for one or more optical channels so that each of the optical fiber lines 1004 and 1006 is capable of carrying signals in both directions. In this case, the amplifiers must be configured to operate bidirectionally.

Alternatively, a receiver/transmitter station 1002 of one end of an optical fiber line has one or more receivers and a receiver/transmitter station 1002 of the other end of the optical fiber line has one or more transmitters. In this case, each of the optical fiber lines 1004 and 1006 will carry signals in only one direction. The two lines can operate in the same direction or as send and return lines, respectively. In any case, the receivers/transmitters of station 1002 may be adapted to transmit one or more independent optical channels. The channels may be multiplexed by any known means, e.g. WDM, TDM or polarization multiplexing. The optical communications system further comprises optical amplifying systems 1008 for amplifying the signal. The optical amplifying systems 1008 are preferably of any of the types described in the present specification.

Even if it has been so far described in relation to two independent optical transmission lines, the present invention applies also to other cases, such as, e.g., the case of two amplifiers arranged together to form a bidirectional amplifying unit operating in a bidirectional optical communication line.

Furthermore, the amplifiers pairs of the two transmission lines according to the present invention form a single unit and may be easily arranged in a single case. That provides a more compact communication system design.

It will be apparent to those skilled in the art that various modification and variations can be made in the optical amplifying system of the present invention without departing from the spirit or scope of the invention. Thus, the present invention is intended to cover also said modifications and variations.

TABLE 1

Results for a system according to FIG. 3 in "hot stand-by" mode with reduction in performance

| | [dB] | Laser pump condition |
|---|---|---|
| Small Signal Gain ($P_{in} = -45$ dBm) | G1 = 35<br>G2 = 35 | $I_{p1} = 150$ mA; $P_{p1} = 18$ mW<br>$I_{p2} = 150$ mA; $P_{p2} = 18$ mW<br>$I_{p3} = 150$ mA; $P_{p3} = 18$ mW<br>$I_{p4} = 150$ mA; $P_{p4} = 18$ mW |
| | G1 = 33, 5<br>G2 = 32, 5 | $I_{p1} = 150$ mA; $P_{p1} = 18$ mW<br>$I_{p2} = 0$ mA; $P_{p2} = 0$ mW<br>$I_{p3} = 150$ mA; $P_{p3} = 18$ mW<br>$I_{p4} = 150$ mA; $P_{p4} = 18$ mW |
| Saturated Signal Gain ($P_{in} = -15$ dBm) | G1 = 24<br>G2 = 24 | $I_{p1} = 150$ mA; $P_{p1} = 18$ mW<br>$I_{p2} = 150$ mA; $P_{p2} = 18$ mW<br>$I_{p3} = 150$ mA; $P_{p3} = 18$ mW<br>$I_{p4} = 150$ mA; $P_{p4} = 18$ mW |
| | G1 = 22<br>G2 = 21 | $I_{p1} = 150$ mA; $P_{p1} = 18$ mW<br>$I_{p2} = 0$ mA; $P_{p2} = 0$ mW<br>$I_{p3} = 150$ mA; $P_{p3} = 18$ mW<br>$I_{p4} = 150$ mA; $P_{p4} = 18$ mW |
| Small Signal Noise Figure ($P_{in} = -45$ dBm) | <6 | $I_{p1} = 150$ mA; $P_{p1} = 18$ mW<br>$I_{p2} = 150$ mA; $P_{p2} = 18$ mW<br>$I_{p3} = 150$ mA; $P_{p3} = 18$ mW<br>$I_{p4} = 150$ mA; $P_{p4} = 18$ mW |
| | <6, 5 | $I_{p1} = 150$ mA; $P_{p1} = 18$ mW<br>$I_{p2} = 0$ mA; $P_{p2} = 0$ mW<br>$I_{p3} = 150$ mA; $P_{p3} = 18$ mW<br>$I_{p4} = 150$ mA; $P_{p4} = 18$ mW |
| Saturated Signal Noise Figure ($P_{in} = -15$ dBm) | <6, 5 | $I_{p1} = 150$ mA; $P_{p1} = 18$ mW<br>$I_{p2} = 150$ mA; $P_{p2} = 18$ mW<br>$I_{p3} = 150$ mA; $P_{p3} = 18$ mW<br>$I_{p4} = 150$ mA; $P_{p4} = 18$ mW |
| | <7 | $I_{p1} = 150$ mA; $P_{p1} = 18$ mW<br>$I_{p2} = 0$ mA; $P_{p2} = 0$ mW<br>$I_{p3} = 150$ mA; $P_{p3} = 18$ mW<br>$I_{p4} = 150$ mA; $P_{p4} = 18$ mW |

TABLE 2

Results for a system according to FIG. 3 in "hot stand-by" mode with reduction in performance

| | [dB] | Laser pump condition |
|---|---|---|
| Small Signal Gain ($P_{in} = -45$ dBm) | G = 35<br>G2 = 35 | $I_{p1} = 150$ mA; $P_{p1} = 18$ mW<br>$I_{p2} = 150$ mA; $P_{p2} = 18$ mW<br>$I_{p3} = P_{p3} = 18$ mW<br>$I_{p4} = 150$ mA; $P_{p4} = 18$ mW |
| | G1 = 35<br>G2 = 35 | $I_{p1} = 320$ Ma; $P_{p1} = 36$ mW<br>$I_{p2} = 0$ mA; $P_{p2} = 0$ mW<br>$I_{p3} = 150$ mA; $P_{p3} = 18$ mW<br>$I_{p4} = 150$ mA; $P_{p4} = 18$ mW |
| Saturated Signal Gain ($P_{in} = -15$ dBm) | G1 = 24<br>G2 = 24 | $I_{p1} = 150$ mA; $P_{p1} = 18$ mW<br>$I_{p2} = 150$ mA; $P_{p2} = 18$ mW<br>$I_{p3} = 150$ mA; $P_{p3} = 18$ mW<br>$I_{p4} = 150$ mA; $P_{p4} = 18$ mW |
| | G1 = 24<br>G2 = 24 | $I_{p1} = 320$ mA; $P_{p1} = 36$ mW<br>$I_{p2} = 0$ mA; $P_{p2} = 18$ mW<br>$I_{p3} = 150$ mA; $P_{p3} = 18$ mW<br>$I_{p4} = 150$ mA; $P_{p4} = 18$ mW |
| Small Signal Noise Figure ($P_{in} = -45$ dBm) | <6 | $I_{p1} = 150$ mA; $P_{p1} = 18$ mW<br>$I_{p2} = 150$ mA; $P_{p2} = 18$ mW<br>$I_{p3} = 150$ mA; $P_{p4} = 18$ mW<br>$I_{p4} = 150$ mA; $P_{p4} = 18$ mW |
| | <6 | $I_{p1} = 0$ mA; $P_{p1} = 36$ mW<br>$I_{p2} = 0$ mA; $P_{p2} = 0$ mW<br>$I_{p3} = 150$ mA; $I_{p3} = 18$ mW<br>$I_{p4} = 150$ mA; $P_{p4} = 18$ mW |
| Saturated Signal Noise Figure ($P_{in} = -15$ dBm) | <6, 5 | $I_{p1} = 150$ mA; $P_{p1} = 18$ mW<br>$I_{p2} = 150$ mA; $P_{p2} = 18$ mW<br>$I_{p3} = 150$ mA; $P_{p3} = 18$ mW<br>$I_{p4} = 150$ mW; $P_{p4} = 18$ mW |
| | <6, 5 | $I_{p1} = 320$ mA; $P_{p1} = 36$ mW<br>$I_{p2} = 0$ mA; $P_{p2} = 0$ mW<br>$I_{p3} = 150$ mA; $P_{p3} = 18$ mW<br>$I_{p4} = 150$ mA; $P_{p4} = 18$ mW |

TABLE 3

Results for a system according to FIG. 6 in "hot stand-by" mode with reduction in performance

| | [dB] | Laser pump condition |
|---|---|---|
| Small Signal Gain ($P_{in} = -45$ dBm) | G1 = 35<br>G2 = 35 | $I_{p1} = 150$ mA; $P_{p1} = 18$ mW<br>$I_{p2} = 150$ mA; $P_{p2} = 18$ mW<br>$I_{p3} = 150$ mA; $P_{p3} = $ |

TABLE 3-continued

Results for a system according to FIG. 6 in "hot stand-by" mode with reduction in performance

| | [dB] | Laser pump condition |
|---|---|---|
| | | 18 mW<br>$I_{p4}$ = 150 mA; $P_{p4}$ = 18 mW |
| | G1 = 34<br>G2 = 34 | $I_{p1}$ = 150 mA; $P_{p1}$ = 18 mW<br>$I_{p2}$ = 0 mA; $P_{p2}$ = 0 mW<br>$I_{p3}$ = 150 mA; $P_{p3}$ = 18 mW<br>$I_{p4}$ = 150 mA; $P_{p4}$ = 18 mW |
| Saturated Signal Gain<br>($P_{in}$ = −15 dBm) | G1 = 24<br>G2 = 24 | $I_{p1}$ = 150 mA; $P_{p1}$ = 18 mW<br>$I_{p2}$ = 150 mA; $P_{p2}$ = 18 mW<br>$I_{p3}$ = 150 mA; $P_{p3}$ = 18 mW<br>$I_{p4}$ = 150 mA; $P_{p4}$ = 18 mW |
| | G1 = 22, 5<br>G2 = 22, 5 | $I_{p1}$ = 150 mA; $P_{p1}$ = 18 mW<br>$I_{p2}$ = 0 mA; $P_{p2}$ = 0 mW<br>$I_{p3}$ = 150 mA; $P_{p3}$ = 18 mW<br>$I_{p4}$ = 150 mA; $P_{p4}$ = 18 mW |
| Small Signal Noise Figure<br>($P_{in}$ = −45 dBm) | <6 | $I_{p1}$ = 150 mA; $P_{p1}$ = 18 mW<br>$I_{p2}$ = 150 mA; $P_{p2}$ = 18 mW<br>$I_{p3}$ = 150 mA; $P_{p3}$ = 18 mW<br>$I_{p4}$ = 150 mA; $P_{p4}$ = 18 mW |
| | <6, 5 | $I_{p1}$ = 150 mA; $P_{p1}$ = 18 mW<br>$I_{p2}$ = 0 mA; $P_{p2}$ = 0 mW<br>$I_{p3}$ = 150 mA; $P_{p3}$ = 18 mW<br>$I_{p4}$ = 150 mA; $P_{p4}$ = 18 mW |
| Saturated Signal Noise Figure<br>($P_{in}$ = −15 dBm) | <6, 5 | $I_{p1}$ = 150 mA; $P_{p1}$ = 18 mW<br>$I_{p2}$ = 150 mA; $P_{p2}$ = 18 mW<br>$I_{p3}$ = 150 mA; $P_{p3}$ = 18 mW<br>$I_{p4}$ = 150 mA; $P_{p4}$ = 18 mW |
| | <7 | $I_{p1}$ = 150 mA; $P_{p1}$ = 18 mW<br>$I_{p2}$ = 0 mA; $P_{p2}$ = 0 mW<br>$I_{p3}$ = 150 mA; $P_{p3}$ = 18 mW<br>$I_{p4}$ = 150 mA; $P_{p4}$ = 18 mW |

TABLE 4

Results for a system according to FIG. 8 in "hot stand-by" mode with reduction in performance

| | [dB] | Laser pump condition |
|---|---|---|
| Small Signal Gain<br>($P_{in}$ = −45 dBm) | G = 35 | $I_{p1}$ = 150 mA; $P_{p1}$ = 18 mW<br>$I_{p2}$ = 150 mA; $P_{p2}$ = 18 mW |
| | G = 30 | $I_{p1}$ = 150 mA; $P_{p1}$ = 18 mW<br>$I_{p2}$ = 0 mA; $I_{p2}$ = 0 mW |
| Saturated Signal Gain<br>($P_{in}$ = −15 dBm) | G = 24 | $I_{p1}$ = 150 mA; $P_{p1}$ = 18 mW<br>$I_{p2}$ = 150 mA; $P_{p2}$ = 18 mW |
| | G = 20 | $I_{p1}$ = 150 mA; $P_{p1}$ = 18 mW<br>$I_{p2}$ = 0 mA; $P_{p2}$ = 0 mW |
| Small Signal Noise Figure<br>($P_{in}$ = −45 dBm) | <6 | $I_{p1}$ = 150 mA; $P_{p1}$ = 18 mW<br>$I_{p2}$ = 150 mA; $P_{p2}$ = 18 mW |
| | <7 | $I_{p1}$ = 150 mA; $P_{p1}$ = 18 mW<br>$I_{p2}$ = 0 mA; $P_{p2}$ = 0 mW |
| Saturated Signal Noise Figure<br>($P_{in}$ = −15 dBm) | <6, 5 | $I_{p1}$ = 150 mA; $P_{p1}$ = 18 mW<br>$I_{p2}$ = 150 mA; $P_{p2}$ = 18 mW |
| | <8 | $I_{p1}$ = 150 mA; $P_{p1}$ = 18 mW<br>$I_{p2}$ = 0 mA; $P_{p2}$ = 0 mW |

TABLE 5

Results for a system according to FIG. 8 in "hot stand-by" mode with reduction in performance

| | [dB] | Laser pump condition |
|---|---|---|
| Small Signal Gain<br>($P_{in}$ = −45 dBm) | G = 35 | $I_{p1}$ = 150 mA; $P_{p1}$ = 18 mW<br>$I_{p2}$ = 150 mA; $P_{p2}$ = 18 mW |
| | G = 35 | $I_{p1}$ = 320 mA; $P_{p1}$ = 36 mW<br>$I_{p2}$ = 0 mA; $P_{p2}$ = 0 mW |
| Saturated Signal Gain<br>($P_{in}$ = −15 dBm) | G = 24 | $I_{p1}$ = 150 mA; $P_{p1}$ = 18 mW<br>$I_{p2}$ = 150 mA; $P_{p2}$ = 18 mW |
| | G = 24 | $I_{p1}$ = 320 mA; $P_{p1}$ = 36 mW<br>$I_{p2}$ = 0 mA; $P_{p2}$ = 0 mW |
| Small Signal Noise Figure<br>($P_{in}$ = −45 dBm) | <6 | $I_{p1}$ = 150 mA; $P_{p1}$ = 18 mW<br>$I_{p2}$ = 150 mA; $P_{p2}$ = 18 mW |
| | <6 | $I_{p1}$ = 320 mA; $P_{p1}$ = 36 mW<br>$I_{p2}$ = 0 mA; $P_{p2}$ = 0 mW |
| Saturated Signal Noise Figure<br>($P_{in}$ = −15 dBm) | <6, 5 | $I_{p1}$ = 150 mA; $P_{p1}$ = 18 mW<br>$I_{p2}$ = 150 mA; $P_{p2}$ = 18 mW |
| | <6, 5 | $I_{p1}$ = 320 mA; $P_{p1}$ = 36 mW<br>$I_{p2}$ = 0 mA; $P_{p2}$ = mW |

What is claimed is:

1. An improved optical communication system comprising:

a first optical fiber line having a first end and a second end;

a second optical fiber line having a first end and a second end;

a first transmitter for transmitting a signal in the first optical line;

a second transmitter for transmitting a signal in the second optical line;

at least one two-stage amplifier in each of said first and second lines;

a first receiver connected to one of the first and second ends of the first optical fiber line for receiving the signal from the first optical line;

a second receiver connected to one of the first and second ends of the second optical fiber line for receiving the signal from the second optical line; and a pair of laser pumps coupled to form a single system that provides a first pumping signal to at least one stage of said at least one amplifier in said first optical fiber line and to at least one stage of said at least one amplifier in said second optical fiber line.

2. An improved optical communication system according to claim 1, wherein said system further provides a second pumping signal to the other stage of said at least one amplifier of each of said first and second lines.

3. An improved optical communication system according to claim 1 or claim 2, including at least four laser pumps.

4. An improved optical communication system according to claim 1 or 2, wherein said laser pumps are laser diode pumps.

5. An improved optical communication system, comprising:
- first and second optical fiber lines;
- a first transmitter for transmitting a signal in the first optical line;
- a second transmitter for transmitting a signal in the second optical line;
- at least one two-stage amplifier in each of said first and second lines;
- a first receiver for receiving the signal from the first optical line;
- a second receiver for receiving the signal from the second optical line; and
- at least four laser pumps coupled to form a single system that provides a first pumping signal to at least one stage of said at least one amplifier of each of said first and second lines;
- a first coupler for coupling output signals of the first and second laser pumps; and
- a second coupler for coupling output signals of the third and fourth laser pumps.

6. An improved optical communication system according to claim 5, wherein said system further comprises a third coupler for coupling a first coupled signal from the first coupler and a first coupled signal from the second coupler, and a fourth coupler for coupling a second coupled signal from the first coupler and a second coupled signal from the second coupler.

7. An improved optical communication system according to claim 1 or 2, wherein each of said stages of the amplifiers in said first and second lines is connected to a wavelength division multiplexer.

8. An improved optical communication system according to claim 1 or 2, wherein said at least one two-stage-amplifier in each of said first and second lines further comprises an isolator arranged between the first and second amplifier stages.

9. An improved optical amplifying system comprising:
- first and second optical fiber lines;
- at least one two-stage amplifier in each of the first and second lines; and
- a pair of laser pumps coupled to form a single system that provides a first pumping signal to at least one stage of said at least one amplifier in said first optical fiber line and to at least one stage of said at least one amplifier in said second optical fiber line.

10. An improved optical amplifying system according to claim 9, wherein said system further provides a second pumping signal to the other stage of said at least one amplifier of each of said first and second lines.

11. An improved optical amplifying system according to claim 9, including at least four laser pumps.

12. An improved optical amplifying system according to claim 9 or 10, wherein said laser pumps are laser diode pumps.

13. An improved optical amplifying system comprising:
- first and second optical fiber lines;
- at least one two-stage amplifier in each of the first and second lines;
- at least four laser pumps;
- a first coupler for coupling output signals of the first and second laser pumps, to provide a first pumping signal to a first stage of said at least one amplifier of each of said first and second lines; and
- a second coupler for coupling output signals of the third and fourth laser pumps to provide a second pumping signal to a second stage of said at least one amplifier of each of said first and second lines.

14. An improved optical amplifying system according to claim 13, wherein said system further comprises a third coupler for coupling a first coupled signal from the first coupler and a first coupled signal from the second coupler, and a fourth coupler for coupling a second coupled signal from the first coupler and a second coupled signal from the second coupler.

15. An improved optical amplifying system according to claim 9 or 10, wherein each of said stages of the amplifiers of said first and second lines are connected to a wavelength division multiplexer.

16. An improved optical amplifying system according to claim 9 or 10, wherein said at least one two-stage-amplifier of each of said first and second lines further comprises an isolator arranged between the first and second amplifier stages.

17. An improvement in a method for providing a laser pump signal in an optical communication system comprising a first and a second optical fiber lines, said method comprising the steps of
- a) generating first and second laser pump signals;
- b) coupling said first and second laser pump signals to form first and second output signals;
- c) generating third and fourth laser pump signals;
- d) coupling said third and fourth laser pump signals to form third and fourth output signals;

the improvement consisting in that
1) the first and second output signals are supplied to one of the first and second stages of an amplifier of said first optical fiber line and to one of the first and second stages of an amplifier of said second optical fiber line; and
2) the third and fourth output signals are supplied to the other of the first and second stages of the amplifier of said first optical fiber line and to the other of the first and second stages of the amplifier of said second optical fiber line.

18. The improvement according to claim 17, wherein the first and third output signals are coupled to form fifth and sixth output signals while the second and fourth output signals are coupled to form seventh and eighth output signals, each of said fifth, sixth, seventh, and eighth output signals beincg supplied to a single stage of the amplifiers of said first or second optical fiber lines.

19. An improved optical communication system according to claim 3, wherein said laser pumps are laser diode pumps.

20. An improved optical amplifying system according to claim 11, wherein said laser pumps are laser diode pumps.

21. An improved optical communication system comprising:
- first and second optical fiber lines;
- a first transmitter for transmitting a signal in the first optical line;
- a second transmitter for transmitting a signal in the second optical line;

at least one two-stage amplifier in each of said first and second lines;

a first receiver for receiving the signal from the first optical line;

a second receiver for receiving the signal from the second optical line; and a pair of laser pumps coupled to form a single system that provides a first pumping signal to at least one stage of said at least one amplifier of each of said first and second lines and provides a second pumping signal to the other stage of said at least one amplifier of each of said first and second lines.

22. An improved optical amplifying system comprising:

first and second optical fiber lines;

at least one two-stage amplifier in each of the first and second lines; and a pair of laser pumps coupled to form a single system that provides a first pumping signal to at least one stage of said at least one amplifier of each of said first and second lines and provides a second pumping signal to the other stage of said at least one amplifier of each of said first and second lines.

* * * * *